United States Patent [19]

Bird et al.

[11] Patent Number: 4,627,457
[45] Date of Patent: Dec. 9, 1986

[54] METHOD AND APPARATUS FOR TREATING A PLURALITY OF ZONES OF A PROCESSING LINE

[75] Inventors: Kenneth J. H. Bird, Beeston; Robert J. Cross, Allestree; Manjit Singh, Kimberley, all of England

[73] Assignee: Diversey Corporation, Mississauga, Canada

[21] Appl. No.: 756,757

[22] Filed: Jul. 18, 1985

[30] Foreign Application Priority Data

Jul. 24, 1984 [GB] United Kingdom ............... 8418778

[51] Int. Cl.$^4$ ............................................. B65G 45/02
[52] U.S. Cl. ......................................... 137/1; 137/154; 137/597; 184/15.3; 198/500
[58] Field of Search ............. 198/500; 184/15.2, 15.3; 137/1, 154, 597

[56] References Cited

U.S. PATENT DOCUMENTS

| 2,706,254 | 4/1955 | Mithoff | 137/154 X |
| 3,726,297 | 4/1973 | Heimann | 137/154 X |
| 4,149,624 | 4/1979 | Douty | 198/500 |
| 4,196,748 | 4/1980 | Gillespie | 137/597 X |
| 4,262,776 | 4/1981 | Wilson | 198/500 X |

FOREIGN PATENT DOCUMENTS

| 0079152 | 5/1983 | European Pat. Off. | 198/500 |
| 920761 | 3/1963 | United Kingdom . | |

Primary Examiner—Robert G. Nilson
Attorney, Agent, or Firm—McAulay, Fields, Fisher, Goldstein & Nissen

[57] ABSTRACT

The invention concerns an apparatus for and a method of treating a plurality of zones of a processing line with a liquid, the liquid comprising a treatment liquid and a carrier liquid, wherein the treatment liquid is introduced into pipes conveying the carrier liquid to each zone as discrete slugs, and wherein the volume of each slug is selectively variable or wherein each slug may be introduced into the pipes at a selectively variable frequency. Preferably the treatment liquid is applied to all zones from a single source, and the slugs, upon discharge at least at one zone, remain substantially concentrated. The invention particularly concerns the lubricating of conveyors as in bottling lines.

19 Claims, 7 Drawing Figures

METHOD AND APPARATUS FOR TREATING A PLURALITY OF ZONES OF A PROCESSING LINE

This invention relates to a method and apparatus for treating a plurality of zones of a processing line with a liquid, this liquid comprising a treatment liquid and a carrier liquid. One particular application of the invention is in the distribution of a lubricant to surfaces which require lubrication, and, more particularly, the distribution of lubricant to conveyors or tracks (hereinafter referred to simply as "tracks") along which bottles or cans are slidably transported. In what follows, the present invention will be described more particularly with reference to this application.

In canning and bottling lines large numbers of cans or bottles are conventionally transported using tracks of stainless steel (or other material). The cans or bottles slide along these tracks and it is necessary to supply to the tracks a lubricating material to reduce friction and also to afford some cleaning action. Such materials are usually water-soluble or water-dispersible and comprise an active lubricating agent, for example a soap, and optionally other components, for example, detergents, solvents (e.g. water or non-ionic solvent), and water softening and conditioning agents.

Canning and bottling lines typically have up to 50 tracks, and the diluted lubricant is applied to the tracks by a spray system, the spray nozzles being fed by a pipework system from a central point. At the central point there is typically a dilution device which takes neat chemical product and dilutes this into, say, a hundred parts of water. The resulting solution is pumped through the pipework system to the spray nozzles. The arrangement just described is well established and is used on a worldwide basis, but has two main deficiencies:

(1) Certain parts of a canning or bottling track need more lubricating and cleaning than others. In particular, in a bottling line which uses bottles which have already been used and are returned dirty by the user, the bottles at the in-feed end have a large amount of soil on them which tends to be transferred to the track. Also, there is liable to be spillage of the product with which the bottles or cans are being filled at the filling station, and the spilt product mostly ends up on the track. Accordingly, additional lubrication is desirable at the filling station and separately at the dirty bottle infeed. The conventional lubrication system allows for only one overall concentration, i.e. the concentration is the same at all points. This concentration must be high enough to cope with the dirtiest part of the line and so in the cleaner parts there is over-lubrication. Since the lubricant is typically a soap-like chemical, over-lubrication leads to excessive foaming. Excess foam is detrimental, for example because it can trigger off optical scanning instruments and if spilt on the floor can lead to a safety hazard. Further, over-lubrication is expensive because lubricant is wasted.

(2) The main constituent of the track lubricant, i.e. the soap or the like, precipitates lime soaps in the presence of hard water, i.e. when mixed with hard water in the diluting system. These precipitates block the spraying nozzles and are generally detrimental to the operation. To overcome this problem it is known to add a sequestering agent to stop precipitation. However, the sequestrant is typically an expensive chemical.

To the best of the applicants' knowledge, the only attempt which has been made to overcome the above disadvantages is that described in European Patent Application No. 0079152 (Chemed Corporation). This application discloses an arrangement where the lubricant and the water are piped separately to different points along a conveyor. This allows the lubricant to be individually metered at each point and further hard water precipitation is avoided because the lubricant and the water are not mixed in the pipework itself. However, these advantages are only achieved at the great expense of providing two separate sets of pipework and nozzles, one for the lubricant and one for the water.

According to the present invention there is provided a method of treating a plurality of zones of a processing line with a liquid, the liquid comprising a treatment liquid and a carrier liquid, wherein the treatment liquid is introduced into pipes conveying the carrier liquid to each zone as discrete slugs, and wherein the volume of each slug is selectively variable or wherein each slug may be introduced into the pipes at a selectively variable frequency.

The invention also provides an apparatus for treating a plurality of zones in a processing line with a liquid, the liquid comprising a treatment liquid and a carrier liquid, the apparatus comprising:
a source of treatment liquid;
a source of carrier liquid;
a plurality of pipes conveying the carrier liquid to each zone; and
means for introducing the treatment liquid into each pipe in discrete slugs of a selectively variable volume or at a selectively variable frequency.

A "discrete slug" is formed when the treatment liquid is introduced into a carrier liquid pipe for a limited amount of time during which the carrier liquid may either continue to flow or may be stopped.

It is preferable if the slug of treatment liquid remains to some extent discrete until it is ejected from the pipe at the zone to be treated, i.e. it does not mix homogeneously with the carrier fluid.

The first advantage of the invention is that the amount of treatment liquid, e.g. lubricant, can be chosen to suit the demands of each individual zone of the processing line by simply changing the size of the slugs or the frequency of their introduction and without the need of a duplicate piping system.

Further advantages will become apparent from the following detailed description of a preferred embodiment of the invention, referring to the drawings, in which.

Figure 3:
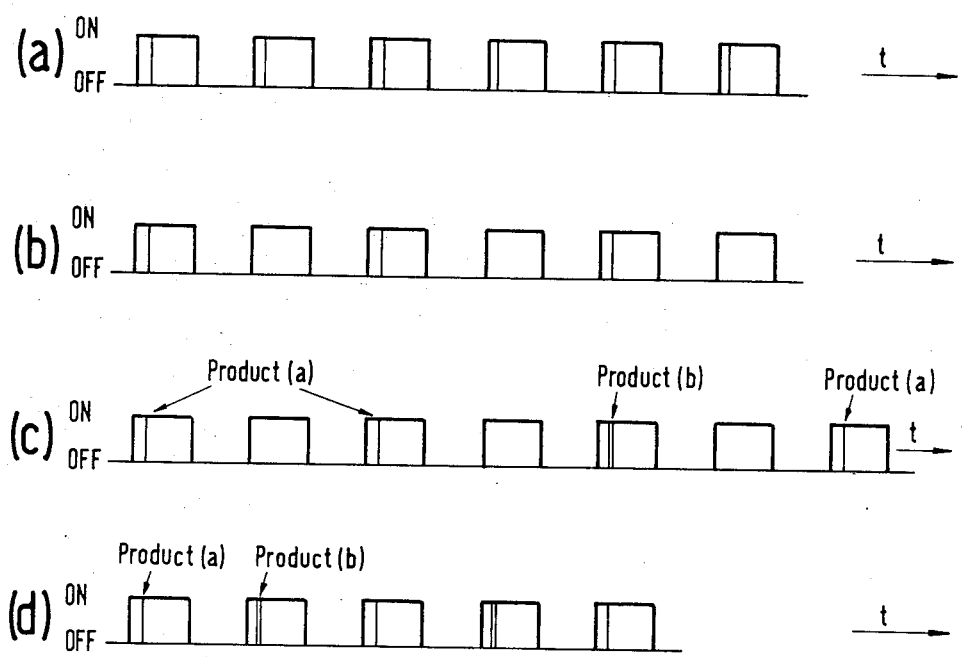
Figure 4:
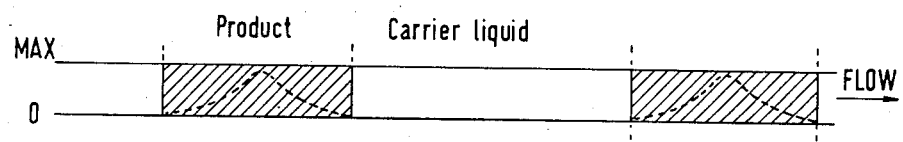

FIG. 3(*a*) to 3(*d*) are diagrams showing the flow carrier liquid with time and the introduction of treatment liquid; and FIG. 4 is a flow diagram showing the elongation of the slug of treatment liquid.

Figure 1:
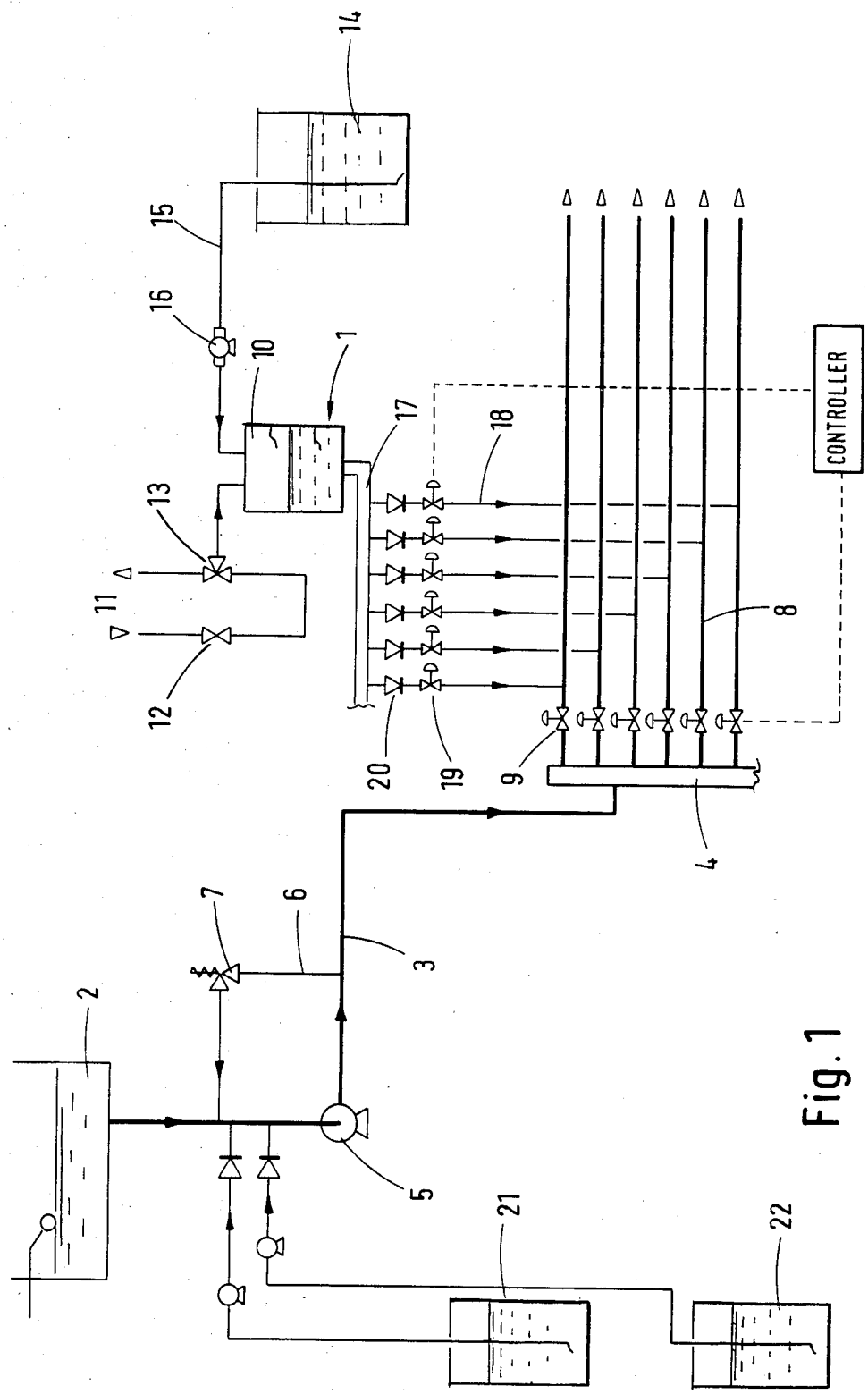
FIG. 1 is a schematic representation of a method and apparatus for treating a plurality of zones of a processing line with a liquid.

In FIG. 1 are shown a source of treatment liquid, in the form of a pressurized reservoir 1 containing a lubricant, and a source of carrier liquid, in the form of a tank 2 containing water.

Water is pumped from the tank 2 to different zones of a bottling line (not shown) wherein lubrication is required. Before the water is sprayed at each zone, the lubricant can be introduced in discrete slugs from the reservoir 1. This is explained in more detail below.

The water passes from the tank 2 through a water main 3 to a distribution manifold 4. In the water main 3 is arranged a pump 5. Intermediate the pump 5 and the manifold 4 is a branch 6 which returns to the water main 3 upstream of the pump 5 through a pressure relief valve 7. This allows water to be returned to the tank 2 if necessary.

A number of pipes 8 branch off from the manifold 4 and each pipe leads to one zone of the bottling line to be treated. In each pipe 8 is arranged a control valve 9, which may be a conventional solenoid valve. The operation of the valves 9 is controlled by a central controller. Each pipe may have a number of nozzles or branches leading to different nozzles.

As mentioned above, the lubricant is supplied from a reservoir 1. An air space 10 is present above the lubricant in the reservoir and this space is maintained at an elevated pressure by means of a source of compressed air 11 which is connected to the space 10 via a pressure regulating valve 12 and a vent valve 13 in a pressure line 14. The reservoir has level sensors (not shown) and when the sensors detect that the level has fallen to a predetermined level, the vent valve 13 is moved to a position in which the space 10 is vented to atmosphere and the reservoir is refilled with lubricant from a supply tank 14 through a line 15 by means of a pump 16. When the sensors detect that a given level has been reached in the reservoir, the pump 16 is switched off and the pressure in the space 10 is re-introduced.

The lubricant is supplied from the reservoir 1 through a distribution main 17 with a number of branches 18, one branch for each pipe 8 for the water. There is a T-connection between each pipe 8 and the corresponding branch 18, this connection being downstream of the control valve 9. Upstream of the connection there is arranged in each branch 18 a dosing valve 19 and upstream of that a non-return valve 20. The dosing valves, which may be shut-off valves, are controlled by the above-mentioned central controller.

The central controller may be a micro-processor into which the desired open/shut times of valves 9 and 19 are programmed.

Figure 2:
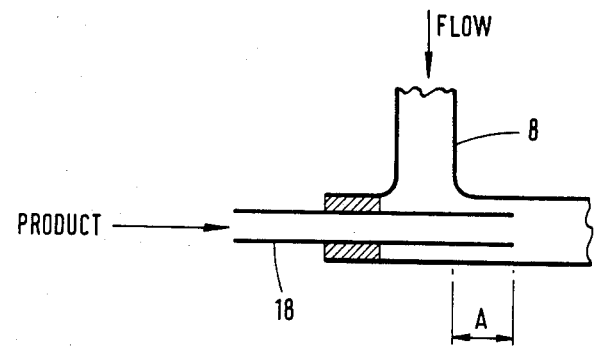
FIG. 2 is a view showing the introduction of the treatment liquid.

The T-connection between the pipe 8 and branch 18 is illustrated in FIG. 2. It will be noted that the branch 18 intrudes into the pipe 8 at a 90° corner of the pipe. The pipe 8 carrying the water flow may be ½ inch (13 mm) pipe, whereas the branch 18 carrying the lubricant product may be a ¼ inch (6 mm) pipe. The branch 18 protrudes ¼ inch (6 mm) beyond the corner of the pipe 8, i.e. measurement A in FIG. 2.

In practice, each zone of the bottling line is treated as follows. The valve 9 in the water pipe 8 is opened on a cyclical basis, the on and off times being controlled by central controller. While the water is flowing in the pipe 8, the dosing valve 19 is opened for a predetermined amount of time. To ensure that the lubricant is injected into the water stream, a differential pressure must be maintained between the lubricant in the reservoir 1 and the water in the manifold 4. The length of time the valve 19 is open and the size of the differential pressure determines the amount of lubricant introduced into the water. To accurately control the amount of lubricant introduced, the pressure in the manifold should be constant and it has been found that this pressure is not stable immediately after the valve 9 is opened. Accordingly, the lubricant is introduced some-time after the valve 9 is opened. The cyclical operation of the valve 9 and the introduction of the lubricant is illustrated in FIG. 3(a), the flow of water being shown by the pulses and, the introduction of lubricant being shown by the vertical line within each pulse. At a differential pressure of 2 bar the valve 9 may be opened for 30s every 60s and the valve 19 opened for 2s when the valve 9 has been opened for 5s.

It should now be explained what happens to the lubricant after it is introduced into the water. It has been found most advantageous from a lubricating and cleaning point of view for a concentrated solution of the lubricant to be produced quickly in the pipe 8, rather than pure lubricant to be transported "wedged" between sections of water. To dilute the lubricant at the point of injection to, say, a 10 or 20% solution, some turbulence within the pipe is needed. This is achieved by injecting the lubricant into the middle of the water stream, as shown in FIG. 2. Also, this tends to keep the lubricant away from the walls of the pipe which prevents the introduced lubricant from elongating excessively by sticking to the pipe walls.

It has been found that by transporting a diluted solution of lubricant along the pipe 8, rather than a "wedge" of pure lubricant, the lubricant divides itself substantially equally between the nozzles of each zone which branch off the pipe 8.

While it is not essential to the invention for the lubricant to remain substantially undiluted in the water pipe, it is advantageous that it dilutes to only a limited extent so that a slug of lubricant/water solution is produced at each nozzle the concentration of which is substantially higher than the ratio of lubricant to water in the pipe. It has been found that benefits are gained if the peak concentration of the slug at ejection in each zone is at least twice that of the solution formed if the slug mixed completely with the water. Further advantages are gained if the peak concentration is five times, or even ten times, that of the homogeneous solution.

One method of maintaining the slugs as discrete as possible is to buffer each end of the slug with air. This means that air from a pressurized source is injected into the water stream in pipe 8 immediately before and after the lubricant is injected. Thus, the slug of lubricant, which initially is mixed with the water into which it is injected to form a concentrated solution, is not mixed further down the pipe because it is protected by a bubble at each end.

Further, it has been found that the extent to which the slug remains discrete, or conversely the amount in elongates, depends inter alia on the flow rate of the water. While the initial length of the slug in pipe 8 is longer the faster the water is flowing, greater elongation occurs later if the flow rate is very low, i.e. in conditions of laminar flow. It has also been found with conventional lubricants that if the water flow is in fact stopped before the slug is injected and then re-started immediately, elongation is great because the lubricant simply tends to adhere to the pipe walls.

Viscosity also affects the elongation of the slug. It has been found that up to a viscosity of 6,000 to 7,000 centipoise there is a decrease in the rate of elongation, but above this figure increased viscosity tends to increase elongation. The range of 6,000 to 7,000 centipoise appears to be a preferred range.

Of course, the length of pipe along which the slug travels also affects the elongation or dilution of the slug.

The longer the pipe, the closer the slug approaches an homogeneous solution.

The concentration profile of the slug of lubricant product is shown in FIG. 4, in dotted lines. The length of the slug, shown shaded, is measured from the points at which the concentration of lubricant is substantially zero. As the slug travels along the pipe, its peak concentration tends to fall and the length of the slug increases. Eventually, the different slugs would join up and the concentration would fall to that of a homogeneous solution.

As can be seen from FIG. 3(b) the lubricant need not be introduced into every "pulse" of water but can be introduced into every second, third or fourth pulse, for example. It has been found that if the slug remains discrete, the lubricant remains on the track or conveyor after it is sprayed for some time and as long as water is continued to be sprayed from time to time the lubricant remains active. This persistency of the lubricant, which means that each zone need only be dosed with lubricant every 10 minutes say, also means that the reservoir 1 can be refilled without any interruption in operation since the refilling typically only takes 2-3 minutes. Also the spraying of water alone helps to dissipate any foam which forms on the tracks. Further, the persistency of the lubricant which occurs when a concentrated solution is sprayed on the tracks means that still less expensive lubricant is needed for a given lubrication.

Because the pipes are often full of pure water with no lubricant and because the slugs of lubricant can remain discrete throughout the pipework, it is clear that the extent to which the lubricant is present in the pipes together with water can be much reduced as compared to the conventional system where a dilute solution is used throughout. Accordingly, precipitation of hard water salts is substantially reduced. This effectively prevents blockage of nozzles by precipitation of hard water salts and also means that chemicals with high lubricating and cleaning properties but limited hard water tolerance can be used.

Precipation can further be avoided by flushing out the pipes 8 with water whenever the system is closed down, for example at the end of a working day. The central controller can be programmed to open the valves 9 and flush the pipes whenever the system remains static for a given period of time (say 30 minutes).

Returning to the primary advantage of the invention over the conventional system, namely the selection of the required amount of lubricant for each zone of the bottling line, the central controller can be programmed to open each dosing valve 19 automatically for the desired length of time or at the desired frequency according to the demands of each zone. A typical volume of lubricant injected into the pipe 8 might be 20 cc.

Because usage of lubricant is more effectively controlled bY the invention, not only is less lubricant necessary than in the conventional system, but also different, cheaper chemicals with higher foaming properties may be used since less foaming due to over-lubrication will occur.

Again, because there is less lubricant in the system (and indeed because there is less contact between water and lubricant as explained above) less expensive sequestrant need be used to sequester the metal ions which cause the precipitation in hard water. The sequestrant may be present in the reservoir of lubricant or can be separately introduced into the water main 3.

Also shown in FIG. 1 is a reservoir 21 connected to the water main 3 upstream of pump 5. The reservoir may contain a biocide which can be fed into the water main 3. With this system, the pipework and tracks or conveyors can be treated with the biocide over-night when the lubricant is not being used. The lubricant itself need not include any biocide and so incompatibility of chemicals is not a problem. As an alternative, the biocide could be introduced when the conveyors are in use but when the lubricant is not being introduced. Thus, for example, the biocide could be injected into water main 3 from reservoir 22 when the lubricant reservoir 1 is being refilled and valves 19 are not being operated. By the time the valves 19 are opened again, the biocide will have been flushed through the system and so will not contact the lubricant in the pipework In another embodiment, illustrated in FIGS. 3(c) and (d), the biocide (product "b") may be dosed into the pipes 8 from a reservoir in the same way as is the lubricant (product "a"). The biocide is introduced into the pulses of water into which lubricant was not introduced so that as long as the slugs of lubricant and biocide remained discrete incompatibility of chemical products is again not a problem. Further, the biocidal action of the chemical in the pipes 8 is improved if it passes down the pipe as a concentrated slug. As shown in the figures, the products may be dosed alternately into every fourth or second water pulse.

In FIG. 1 is also illustrated another reservoir 23 connected to the water main 3 upstream of the manifold 4. This reservoir may contain a corrosion inhibitor which can be introduced in the same manner as the biocide described above.

Examples of lubricants are soaps, phosphate esters, amine salts, amphoteric or quaternary salts. Detergents, such as non-ionic or anionic amphoteric detergents, may be added, as may sequestrants such as polycarboxylic acids, phosphonates, polyphosphates, polyacrylates. Solvents and hydrotropes, such as alcohols and sulphonic acids, may further be added.

EXAMPLE

The following table shows the treatment of a number of zones of a bottling line with a lubricant. Each zone has a number of different nozzles. The water flows for so many seconds out of every 60s and the lubricant is introduced into every $n^{th}$ pulse of water. The differential pressure is 2 bar. The injection point is as illustrated in FIG. 2.

It can be seen that the amount of lubricant fed to each zone can be individually controlled so that over-lubrication or under-lubrication does not occur. Further, for the same levels of cleanness and lubrication as compared with a conventional system, less lubricant overall is used.

TABLE

|  | Zone 1 | Zone 2 | Zone 3 | Zone 4 |
| --- | --- | --- | --- | --- |
| No. of nozzles in each zone | 31 | 22 | 45 | 9 |
| Cycle time(s) | | | | |
| ON | 30 | 30 | 30 | 45 |
| OFF | 30 | 30 | 30 | 15 |
| TOTAL | 60 | 60 | 60 | 60 |
| Water pressure (bar) | .75 | .75 | 1.5 | 1.0 |
| Dose cycle (n) | 3 | 3 | 3 | 2 |
| Flow/n cycles (ml) | 150 | 240 | 200 | 200 |
| 'Lube' use/n cycles (ml) | 12.56 | 10.56 | 17.10 | 5.4 |
| Dosing time(s) | 2.0 | 1.5 | 3.5 | 0.7 |

TABLE-continued

| | Zone 1 | Zone 2 | Zone 3 | Zone 4 |
|---|---|---|---|---|
| 'Lube' use/hour (ml) | 377 | 211 | 342 | 162 |

We claim:

1. A method of treating a plurality of zones of a processing line with a liquid, the liquid comprising a treatment liquid and a carrier liquid, wherein the treatment liquid is introduced as discrete slugs, into pipes conveying the carrier liquid to each zone, and wherein the volume of each slug is selectively variable or wherein each slug may be introduced into the pipes at a selectively variable frequency.

2. A method according to claim 1, wherein the treatment liquid is applied to all zones from a single source.

3. A method according to claim 2, wherein the slugs, upon discharge at least at one zone, remain substantially concentrated.

4. A method of treating a plurality of zones of a processing line with a liquid, the liquid comprising a treatment liquid and a carrier liquid, wherein the treatment liquid is introduced as discrete slugs, into pipes conveying the carrier liquid to each zone, and wherein the volume of each slug is selectively variable or wherein each slug may be introduced into the pipes at a selectively variable frequency, the treatment liquid being applied to all zones from a single source, said slugs, upon discharge at least at one zone, remaining substantially concentrated, the peak concentration of the slugs at the discharge being at least twice, preferably at least five times, the concentration of a homogeneous solution of the treatment liquid in the carrier liquid in the pipe.

5. A method according to claim 2, wherein the carrier fluid is conveyed to each zone in pulses and the treatment fluid is introduced into at least some of the pulses.

6. A method of treating a plurality of zones of a processing line with liquid, the liquid comprising a treatment liquid and a carrier liquid, wherein the treatment liquid is introduced as discrete slugs into pipes conveying the carrier liquid to each zone, and wherein the volume of each slug is selectively variable or wherein each slug may be introduced into the pipes at a selectively variable frequency, the treatment liquid being applied to all zones from a single source, each slug being buffered from the carrier liquid by gas.

7. A method according to claim 1, wherein the treatment liquid is a lubricant.

8. A method according to claim 1, wherein the processing line comprises a track to be treated.

9. A method according to claim 7, wherein the processing line comprises a track to be treated.

10. An apparatus for treating a plurality of zones in a processing line with a liquid, the liquid comprising a treatment liquid and a carrier liquid, the apparatus comprising:
a source of treatment liquid;
a source of carrier liquid;
a plurality of pipes conveying the carrier liquid to each zone; and
means for introducing the treatment liquid into each pipe in discrete slugs of a selectively variable volume or at a selectively variable frequency.

11. An apparatus according to claim 10, wherein the source of treatment liquid is a single source for all zones.

12. A apparatus for treating a plurality of zones in a processing line with a liquid, the liquid comprising a treatment liquid and a carrier liquid, the apparatus comprising:
a source of treatment liquid;
a source of carrier liquid;
a plurality of pipes conveying the carrier liquid to each zone; and
means for introducing the treatment liquid into each pipe in discrete slugs of a selectively variable volume or at a selectively variable frequency;
the source of treatment liquid being a single source for all zones;
the introducing means comprising a branch for the treatment liquid which intrudes into an angle in the pipe for the carrier liquid, and valves controlling the flow of the treatment and carrier liquid.

13. An apparatus according to claim 11, further comprising a central controller for controlling the introducing means.

14. An apparatus according to claim 11, including means for introducing at least one further treatment liquid into the carrier liquid upstream of where the slugs are introduced into the pipes.

15. An apparatus according to claim 14, wherein the further treatment liquid is a biocide.

16. An apparatus according to claim 14, wherein the further treatment liquid is a corrosion inhibitor.

17. An apparatus according to claim 10, wherein the source of treatment liquid is a source of lubricant.

18. A processing line having an apparatus according to claim 10, the processing line comprising a track.

19. A processing line according to claim 18, wherein the source of treatment liquid is a source of lubricant.

* * * * *